Patented Oct. 9, 1934

1,976,044

UNITED STATES PATENT OFFICE 1,976,044

AZO DYE AND METHOD FOR ITS PREPARATION

Francis Hervey Smith, Woodstown, N. J., and Crayton Knox Black, Wilmington, Del., assignors to E. I. du Pont de Nemours & Company, Wilmington, Del., a corporation of Delaware No Drawing. Application July 27, 1932, Serial No. 625,200

18 Claims. (Cl. 260—70)

This invention relates to new polyazo dyes and more particularly refers to polyazo dyes especially adapted for dyeing leather.

Heretofore, when it was desired to obtain certain shades of leather, particularly the various shades of brown, it was necessary to mix several dyes in order to obtain the desired shade. This resulted in the production of a color which was not uniform and which had poor stability.

It is an object of this invention to produce polyazo dyes especially adapted for dyeing leather. A further object is to produce dyes which may be used to impart colors to leather which formerly could be obtained only by the use of a mixture of dyes. A still further object is to produce dyes which may be used to dye wool and other material. Additional objects will appear hereinafter.

These objects are attained by the process of the present invention wherein a polyazo dye having the following general formula is produced:

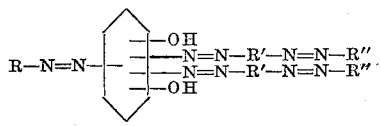

In this formula R, R' and R" represent aryl groups. These polyazo dyes may be produced by coupling a diazotized aromatic amine with a dihydroxy-benzene, coupling this compound with two equivalents of a diazotized aromatic nitro-amine or mono-acyl-diamine, treating the resulting compound to convert the nitro or mono-acyl-amino group to amino groups, then diazotizing and coupling with two equivalents of an aromatic coupling component.

This invention will be more fully understood by reference to the following examples in which the quantities are stated in parts by weight.

Example 1

17.3 parts of sulfanilic acid were diazotized with 9 parts of 100% hydrochloric acid and 6.9 parts of sodium nitrite in the usual manner. 11 parts of resorcin dissolved in water were added to the diazo and the acidity reduced to "no test" on Congo red papers by the addition of sodium acetate. When coupling was complete the solution was made alkaline to brilliant yellow by the addition of 20 parts of sodium hydroxide, and the diazo from 39.8 parts of picramic acid was added. When coupling was complete, the solution was made slightly acid with hydrochloric acid and then alkaline with freshly slaked lime. The dye was heated to 95° C. and reduced by the addition of 31.8 parts of Ca(SH)$_2$ in solution. Reduction was complete in 2 hours at 95° C. The dye was isolated by filtration and reslurried in 600 parts of water. The solution was cooled to 20° C. and tetrazotized by the addition of 18 parts of hydrochloric acid and 13.8 parts of sodium nitrite. A solution of 40 parts of meta phenylene diamine sulfonic acid in 400 parts of water was added to the tetraazo and sodium acetate was added until the solution was no longer acid to Congo red paper. When coupling was complete the solution was salted 10% by volume and filtered.

The dry dye was a black powder which dissolved in water to give a yellow-brown solution and in concentrated sulfuric acid to give a red-brown solution.

It dyed leather a dark red-brown.

Its probable formula is as follows:

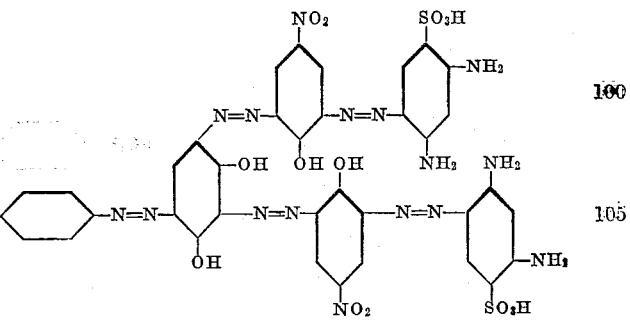

On reducing with sodium hydrosulfite the following products are obtained:
Sulfanilic acid
1,3,5-triamino resorcin
2,4,6-triamino phenol
2,4,5-triamino benzene sulfonic acid The dry dye was a black powder which dissolved in water to give a brown solution and in concentrated sulfuric acid to give a red-brown solution.

It dyed leather a yellow-brown.

Its probable formula is as follows:

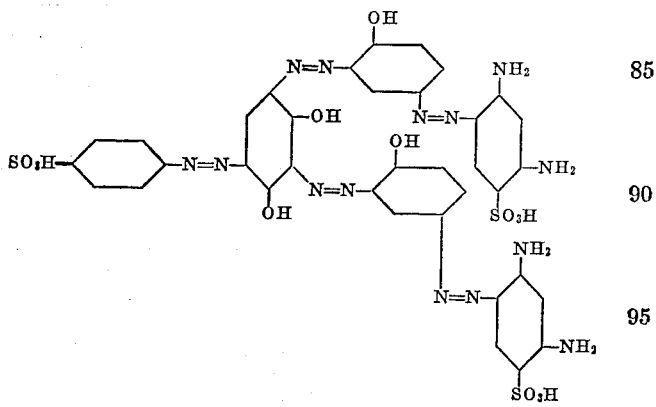

Example 2

27.6 parts of p-nitroaniline were substituted for the 39.8 parts of picramic acid in Example 1.

The dry dye was black powder which dissolved in water to give a yellow-brown solution and in concentrated sulfuric acid to give a violet solution.

It dyed leather a red-brown.

Its probable formula is as follows:

On reducing with sodium hydrosulfite the following products are obtained:
Sulfanilic acid
1,3,5-triamino resorcin
p-phenylene diamine
2,4,5-triamino benzene sulfonic acid

Example 3

30.8 parts of p-nitro-o-amino phenol were substituted for the 39.8 parts of picramic acid in Example 1.

On reducing with sodium hydrosulfite the following products are obtained:
Sulfanilic acid
1,3,5-triamino resorcin
2,4-diamino phenol
2,4,5-triamino benzene sulfonic acid

Example 4

13.8 parts of p-nitroaniline were substituted for the 39.8 parts of picramic acid in Example 1. After stirring this coupling 10 minutes, the diazo from 19.9 parts of picramic acid was also added. When coupling was complete the dye was reduced and finished as in Example 1.

The dry dye was a black powder which dissolved in water to give a brown solution and in concentrated sulfuric acid to give a violet solution.

It dyed leather a dark brown.

Its probable formula is as follows:

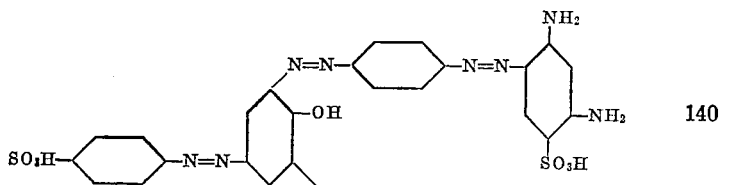
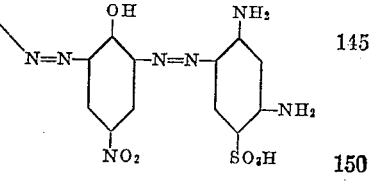

On reducing with sodium hydrosulfite the following compounds are obtained:

Sulfanilic acid
1,3,5-triamino resorcin
p-phenylene diamine
2,4,6-triamino phenol
2,4,5-triamino benzene sulfonic acid

Example 5

22.3 parts of naphthionic acid were substituted for the 17.3 parts of sulfanilic acid in Example 1. The dry dye was a black powder which dissolved in water to give a brown solution and in concentrated sulfuric acid to give a violet solution.

It dyed leather a red-brown.

Its probable formula is as follows:

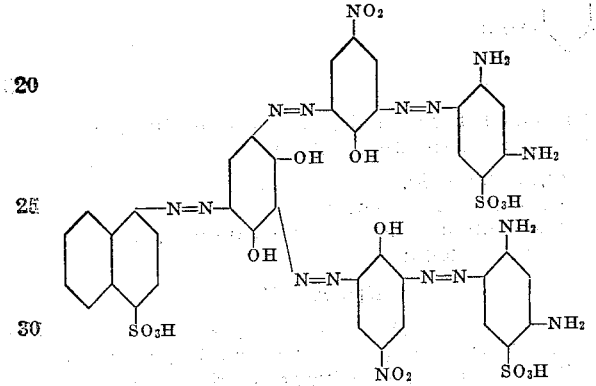

On reducing with sodium hydrosulfite the following compounds are obtained:

Naphthionic acid
1,3,5-triamino resorcin
2,4,6-triamino phenol
2,4,5-triamino benzene sulfonic acid

Example 6

30.3 parts of amino G salt were substituted for the 17.3 parts of sulfanilic acid in Example 1. The dry dye was a black powder which dissolved in water to give a brown solution and in concentrated sulfuric acid to give a red-brown solution.

It dyed leather a red-brown.

Its probable formula is as follows:

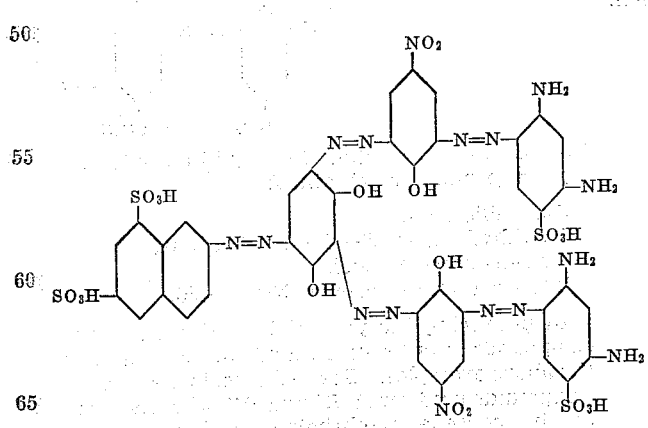

On reducing with sodium hydrosulfite the following compounds are obtained:

Amino G salt
1,3,5-triamino resorcin
2,4,6-triamino phenol
2,4,5-triamino benzene sulfonic acid

Example 7

60 parts of sulfo phenyl methyl pyrazolone were substituted for the 40 parts of meta phenylene diamine sulfonic acid in Example 1.

The dry dye was a black powder which dissolved in water to give a yellow-brown solution and in concentrated sulfuric acid to give a brown solution.

It dyed leather a dark brown.

Its probable formula is as follows:

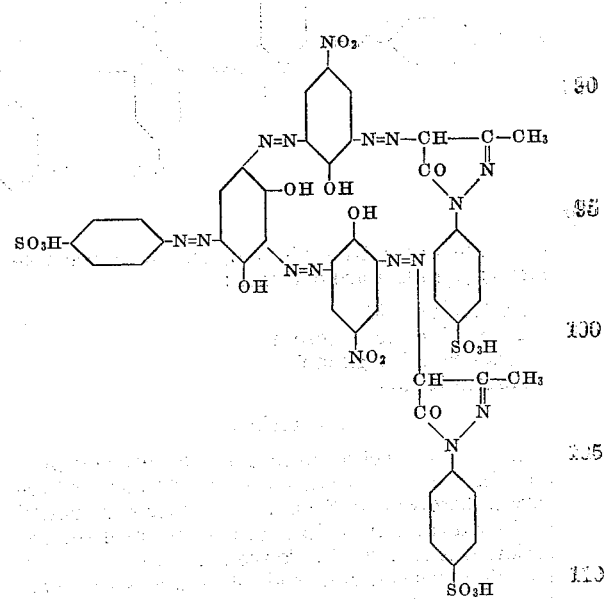

On reducing with sodium hydrosulfite the following compounds are obtained:

Sulfanilic acid
1,3,5-triamino resorcin
2,4,6-triamino phenol
Amino sulfo phenyl methyl pyrazolone

Example 8

65 parts of R salt dissolved in excess soda ash solution were substituted for the 40 parts of meta phenylene diamine in Example 1. No sodium acetate was used in the last coupling.

The dry dye was a black powder which dissolved in water to give a red-brown solution and in concentrated sulfuric acid to give a violet solution.

It dyed leather a blue-black.
Its probable formula is as follows:

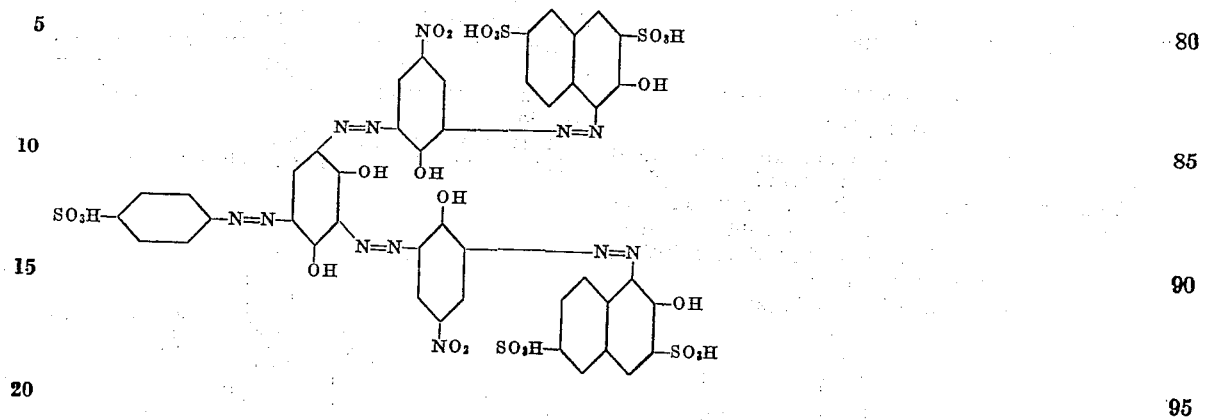

On reducing with sodium hydrosulfite the following products are obtained:

Sulfanilic acid
1,3,5-triamino resorcin
2,4,6-triamino phenol
Amino R salt

Example 9

56 parts of acetyl amino 1,4,7 Cleve's acid were diazotized in the usual manner. 22 parts of resorcin dissolved in 200 parts of water were added and then sodium acetate was added until the solution was neutral to Congo red papers. When coupling was complete the solution was made alkaline to brilliant yellow with sodium hydroxide and heated to 90° C. for 30 minutes. When saponification was complete the solution was cooled, and diazotized with 18 parts of hydrochloric acid and 13.8 parts of sodium nitrite.

This diazo body was added to the alkaline first combination of sulfanilic acid—resorcin made as in Example 1.

When coupling was complete the solution was made slightly acid with hydrochloric acid and filtered cold.

The dry dye was a black powder which dissolved in water to give a brown solution and in concentrated sulfuric acid to give a red-brown solution.

It dyed leather a dark red-brown.
Its probable formula is as follows:

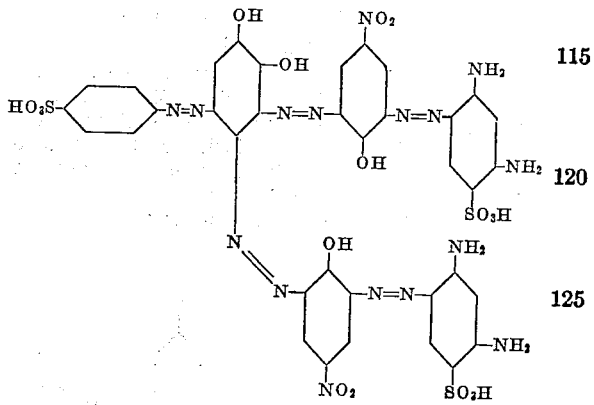

On reducing with sodium hydrosulfite the following compounds are obtained:

Sulfanilic acid.
1,3,5-triamino resorcin.
1,4-diamino naphthalene-7-sulfonic acid.
Amino resorcin.

Example 10

11.0 parts of 1,2-dihydroxy-benzene were substituted for the 11 parts of resorcin in Example 1.

The dry dye was a black powder which dissolved in water to give a yellow-brown solution and in concentrated sulfuric acid to give a red-brown solution.

It dyed leather a yellow-brown.
Its probable formula is as follows:

On reducing with sodium hydrosulfite the following compounds are obtained:

Sulfanilic acid.
1,2-dihydroxy-3,4,5-triamino-benzene.
2,4,6-triamino phenol.
2,4,5-triamino benzene sulfonic acid.

In practicing the present invention numerous compounds may be substituted for those used in the above examples. For instance, in place of the compounds used for R, R' and R'' other members of the benzene, naphthalene, anthracene, diphenyl, phenyl-naphthyl, dinaphthyl, and carbazole series may be used. These members may have substituted thereon groups such as halogen, alkyl, alkoxy, hydroxy, nitro, amide, carboxyl, sulfonic, aryloxy, and aralkyl.

In selecting the components designated by R' in the general formula, it is advisable to use nitro-amine or mono-acyl-diamine derivatives of the compounds previously referred to. After diazotization and coupling the nitro or mono-acyl-amino group is converted to the amino group by methods well known to one skilled in the art. Very satisfactory results have been obtained in the case of the nitro group by reducing with calcium sulfhydrate; in the case of the mono-acyl-amino group by reacting with sodium hydroxide. These methods for producing the amino group are not intended as a limitation, since numerous other methods of producing the same result may also be used without departing from the scope of the present invention.

It is to be understood that the components designated by R' may be dissimilar, as illustrated in Example 4. Likewise, the components designated by R'' may be dissimilar. The means by which this is accomplished are well known, and need not be described herein.

In addition to the aromatic compounds previously mentioned as suitable for the components designated by R'' other compounds may be used such as the pyrazolones, acyl acet-arylides, or other components of the general formula:

Among the compounds which may be substituted for R'' with satisfactory results are the following:

2-naphthol-6-sulfonic acid
2-naphthol-8-sulfonic acid
2-naphthol-5-sulfonic acid
2-naphthol-7-sulfonic acid
2-naphthol-3,7-disulfonic acid
2-naphthol-4,8-disulfonic acid
2-naphthol-6,8-disulfonic acid
2-naphthol-3,6,8-trisulfonic acid
1-naphthol-2-sulfonic acid
1-naphthol-4-sulfonic acid
1-naphthol-5-sulfonic acid
1-naphthol-3,6,8-trisulfonic acid
a-naphthylamine
b-naphthylamine
1-amino-5-naphthol-7-sulfonic acid
1-amino-7-naphthol-3-sulfonic acid
1-amino-8-naphthol-4-sulfonic acid
1-amino-8-naphthol-6-sulfonic acid
2-amino-3-naphthol-6-sulfonic acid
2-amino-5-naphthol-7-sulfonic acid
2-amino-7-naphthol-3-sulfonic acid
b-hydroxy naphthoic acid
J-acid urea
p-amino benzoyl J-acid
Phenyl-J-acid
Salicylic acid
1,6-Cleve's acid
1,7-Cleve's acid
Naphthionic acid
Phenyl methyl pyrazolone
Chlor sulfo phenyl methyl pyrazolone
Aceto acetanilide
Aceto acet ortho chlor anilide
Methyl indole The polyazo dyes described herein are exceptionally well adapted for dyeing leather in certain shades, particularly the numerous shades of brown, since they eliminate the necessity of using a mixture of dyes to obtain these shades, and impart a much more uniform and stable color than was formerly possible. The utility of these products is not confined to the dyeing of leather, however, since they may also be used for dyeing wool and other material.

As many apparently widely different embodiments of this invention may be made without departing from the spirit and scope thereof, it is to be understood that we do not limit ourselves to the specific embodiments thereof except as defined in the appended claims.

We claim:

1. A process for producing azo dyes which comprises coupling a diazotized aromatic amine with a dihydroxy-benzene, coupling this compound with two equivalents of a member selected from the group consisting of diazotized aromatic nitro-amines and mono-acyl-diamines, treating the resulting compound to convert the nitro or mono-acyl-amino groups to amino groups, then diazotizing and coupling with two equivalents of an aromatic coupling component.

2. A process for producing azo dyes which comprises coupling a diazotized aromatic amine selected from the group consisting of amines of the benzene, naphthalene, anthracene, diphenyl, phenyl-naphthyl, dinaphthyl, and carbazole series, which may have substituted thereon members selected from the group consisting of halogen, alkyl, alkoxy, hydroxy, nitro, amide, carboxyl, sulfonic, aryloxy, and aralkyl, with a dihydroxy-benzene, coupling this compound with two equivalents of a member selected from the group consisting of diazotized aromatic nitro-amines and mono-acyl-diamines of the benzene, naphthalene, anthracene, diphenyl, phenyl-naphthyl, dinaphthyl, and carbazole series, which may have substituted thereon members selected from the group consisting of halogen, alkyl, alkoxy, hydroxy, nitro, amide, carboxyl, sulfonic, aryloxy, and aralkyl, treating the resulting compound to convert the nitro or mono-acyl-amino groups to amino groups, then diazotizing and coupling with two equivalents of an aromatic coupling component selected from the group consisting of amines of the benzene, naphthalene, anthracene, diphenyl, phenyl-naphthyl, dinaphthyl, and carbazole series, which may have substituted thereon members selected from the group consisting of halogen, alkyl, alkoxy, hydroxy, nitro, amide, carboxyl, sulfonic, aryloxy, and aralkyl.

3. The process of claim 1 wherein the dihydroxy benzene is coupled with dissimilar components, and wherein these dissimilar components are then coupled with end components which may be dissimilar.

4. The process of claim 2 wherein the dihydroxy benzene is coupled with dissimilar components, and wherein these dissimilar components are then coupled with end components which may be dissimilar.

5. The process described in claim 1 wherein the individual components are members of the benzene or naphthalene series.

6. The process described in claim 2 wherein the individual components are members of the benzene or naphthalene series, and wherein the dihydroxy-benzene is resorcin.

7. A process for producing an azo dye which comprises coupling diazotized sulfanilic acid with resorcin, coupling this compound with two equivalents of diazotized picramic acid, treating the resulting compound to convert the nitro groups to amino groups, then diazotizing and coupling with two equivalents of meta-phenylene-diamine-sulfonic acid.

8. A process for producing an azo dye which comprises coupling diazotized amino-G salt with resorcin, coupling this compound with two equivalents of diazotized picramic acid, treating the resulting compound to convert the nitro groups to amino groups, then diazotizing and coupling with two equivalents of meta-phenylene-diamine-sulfonic acid.

9. A polyazo dye having the following general formula:

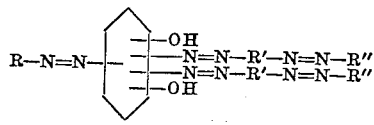

in which R, R' and R'' represent aryl groups.

10. A polyazo dye having the following general formula:

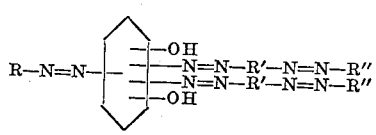

in which R, R' and R'' represent members selected from the group consisting of amines of the benzene, naphthalene, anthracene, diphenyl, phenylnaphthyl, dinaphthyl, and carbazole series, which may have substituted thereon members selected from the group consisting of halogen, alkyl, alkoxy, hydroxy, nitro, amide, carboxyl, sulfonic, aryloxy, and aralkyl.

11. A polyazo dye as defined by claim 9 in which the components represented by R' and/or R'' may be dissimilar.

12. A polyazo dye as defined by claim 10 in which the components represented by R' and/or R'' may be dissimilar.

13. A polyazo dye having the following general formula:

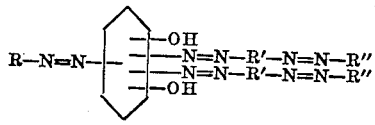

in which R, R' and R'' represent members of the benzene or naphthalene series.

14. A polyazo dye having the following general formula:

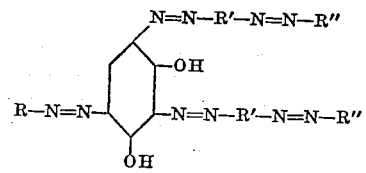

in which R, R' and R'' represent members of the benzene or naphthalene series.

15. A polyazo dye having the following formula:

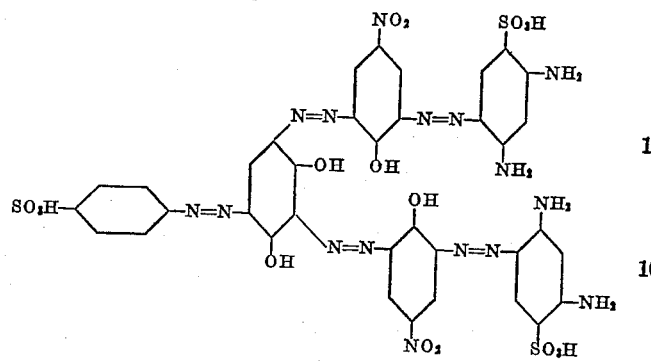

16. A polyazo dye having the following formula:

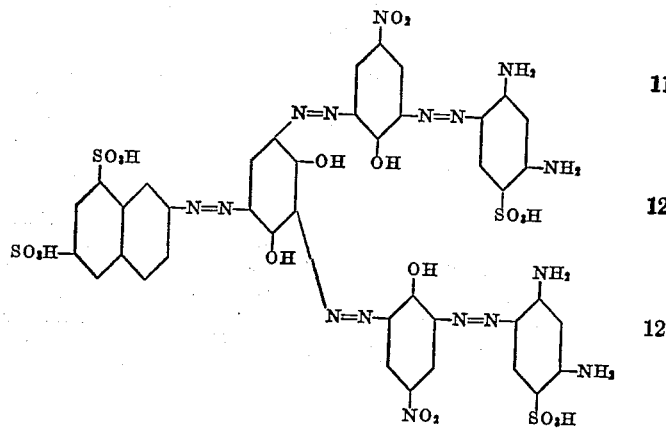

17. A polyazo dye containing five azo groups having as a component thereof, with which three azo groups are coupled, the dihydroxy-benzene grouping.

18. A polyazo dye containing five azo groups having as a component thereof, with which three azo groups are coupled, resorcin.

FRANCIS HERVEY SMITH.
CRAYTON KNOX BLACK.